June 7, 1966  E. C. AUSTIN  3,255,323
AUTOMOTIVE MAINTENANCE SIGNALLING DEVICE
Filed May 21, 1964  3 Sheets-Sheet 1

Edward C. Austin,
Inventor.
Koenig, Senniger, Powers and Leavitt,
Attorneys.

June 7, 1966  E. C. AUSTIN  3,255,323
AUTOMOTIVE MAINTENANCE SIGNALLING DEVICE
Filed May 21, 1964  3 Sheets-Sheet 2

June 7, 1966 E. C. AUSTIN 3,255,323
AUTOMOTIVE MAINTENANCE SIGNALLING DEVICE
Filed May 21, 1964 3 Sheets-Sheet 3
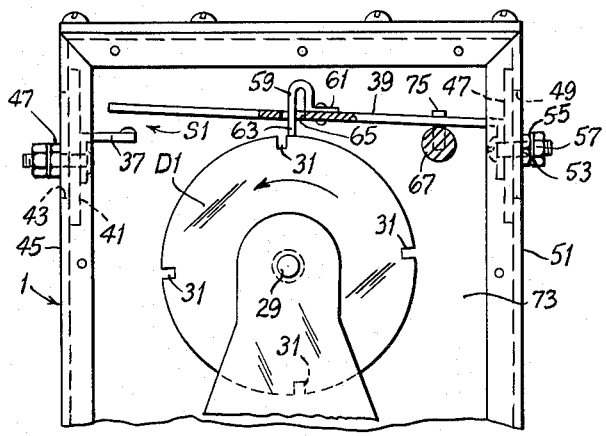
FIG. 5.
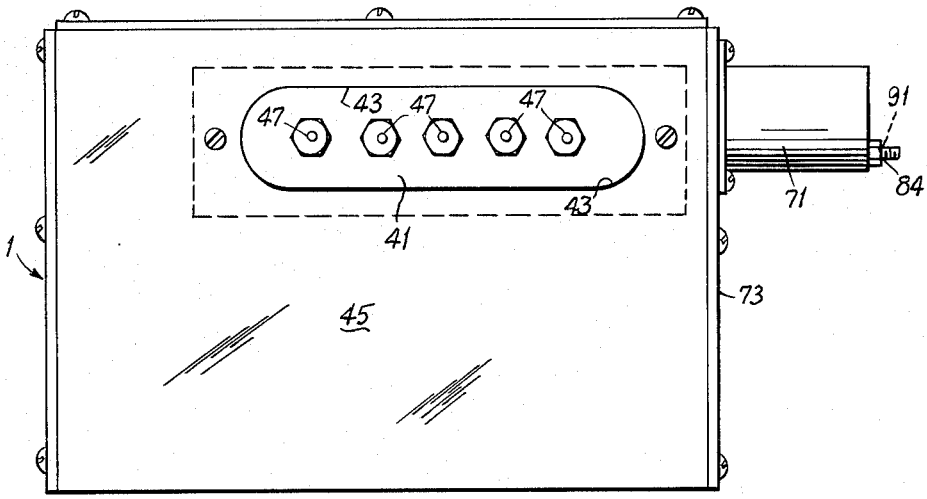
FIG. 6.
FIG. 8. FIG. 9. FIG. 11. FIG. 12.
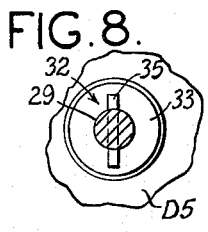 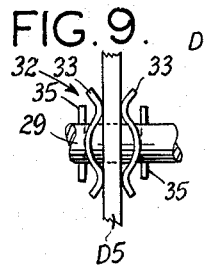 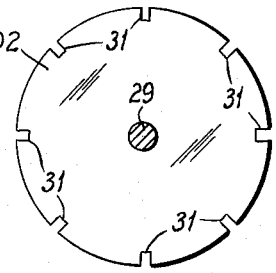 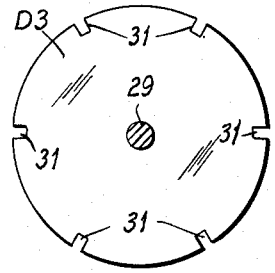

United States Patent Office

3,255,323
Patented June 7, 1966

3,255,323
AUTOMOTIVE MAINTENANCE SIGNALLING
DEVICE
Edward C. Austin, 514 Meramec Station Road,
Manchester, Mo.
Filed May 21, 1964, Ser. No. 369,217
11 Claims. (Cl. 200—52)

This invention relates to an automotive maintenance signalling device, and more particularly to such a device which will cumulate mileage intervals independently for a plurality of service maintenance functions, and signal the driver of an automotive vehicle as to said functions.

Most modern automotive vehicles require a variety of service functions which are to be performed at different mileage intervals. Many manufacturers are now endeavoring to specify longer service intervals than ever before and various imported vehicles require correspondingly varied service procedures. For example, while domestic engines using hydraulic valve lifters may not require valve adjustment at all, the popular German Volkswagen, having an air-cooled engine, is intended to have a valve adjustment at 3,000 mile intervals. It is thus easily seen that the owner may become confused or forgetful and thereby omit some important maintenance item to the ultimate detriment of the performance of his vehicle. Conversely, overcautious owners may incur unnecessary expenditures in attempting to properly maintain their vehicles.

Accordingly, objects of the present invention are to provide a maintenance signalling device which will automatically indicate when an appropriate interval has passed to necessitate a given maintenance procedure; which will provide correspondingly appropriate indications for a plurality of maintenance functions, such as oil change, oil filter change, lubrication, etc.; which will provide a sustained indication when once initiated; which can be easily reset to begin a new interval following completion of a given service function; which will continue to cumulate intervals toward the indication of other maintenance functions after the indication for one such function has been given; and which is simple and reliable in operation.

In one aspect, the invention involves a plurality of cam disks which are frictionally driven, through appropriate reduction gearing, from the speedometer cable of the vehicle. The cam disks are arranged to operate associated switches at intervals which correspond to the desired maintenance intervals. The switches in turn energize appropriate indicating devices. The engagement between the cam disks and switches is such that, when a switch is actuated, the motion of the corresponding disk is arrested, the other disks being permitted to continue. After the service is performed, the device is reset by disengaging the operating portion of the switch from the cam. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan view, partially broken away, of an automotive maintenance signalling device with associated indicating light assembly of this invention;

FIG. 5 is a view similar to FIG. 4 showing the device in its reset condition;

FIG. 6 is a front elevation of the device;

FIG. 8 is a section taken on the line 8—8 of FIG. 1 showing a friction clutch;

FIG. 9 is an edge view of the clutch shown in FIG. 8;

FIG. 11 is a view of an interval timing disk for 1500 mile intervals;

FIG. 12 is a view of an interval timing disk for 2,000 mile intervals; and

Corresponding reference characters indicate corresponding parts throughout the several views of the drawings.

Figure 1:
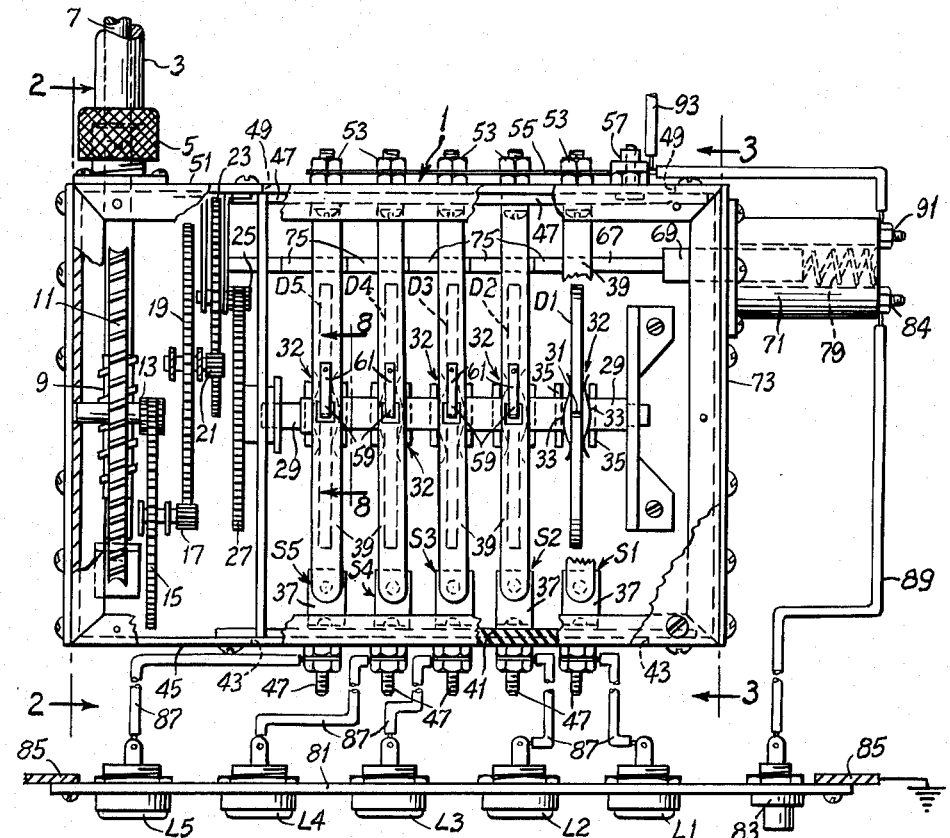
Figure 2:
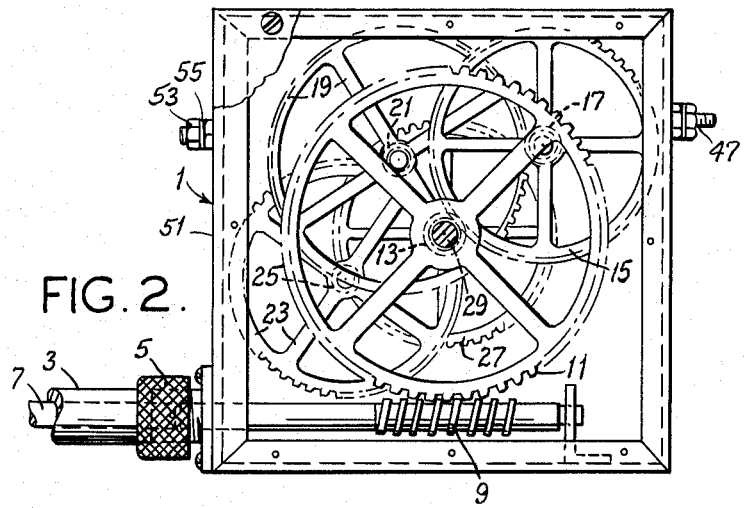
FIG. 2 is a view taken on line 2—2 of FIG. 1, with parts broken away.

Preferably the maintenance signalling device of this invention is driven from the conventional speedometer cable of the automobile to which the sigalling device is applied. A worm gear T-connection can be inserted between the speedometer cable and the speedometer and a second flexible cable, similar to the speedometer cable, can extend to the signalling device. The signalling device may then be mounted in any convenient location, such as behind the dashboard. Such T-connection joints and extension cables are known in the art, the joint herein used being geared to provide an output shaft speed of a hundred revolutions per mile of vehicle travel.

Referring to drawings, a signalling device made in accordance with this invention is shown to comprise a housing 1. Leading to the housing from a worm gear T-connection such as above mentioned is an extension cable, the sheath 3 of which is attached to one side wall of the housing adjacent one end of the housing by a suitable fitting at 5. The flexible shaft 7 within the sheath extends into the housing, and has a worm 9 coupled to its inner end. The worm meshes with a worm wheel 11, mounted for rotation at the end of the housing. The ratio of the worm and worm wheel is such that the latter makes one revolution for every mile of travel of the vehicle. The shaft of the worm wheel 11 carries a pinion 13. This pinion drives a train of spur gears arranged as a compound speed reducing system. This gear train comprises, in succession, a spur gear 15, a pinion 17, a spur gear 19, a pinion 21, a spur gear 23, a pinion 25 and a final spur gear 27. The gear ratios are chosen so that the gear 27 rotates once every 12,000 miles of travel of the vehicle. The various elements of the gear train are, of course, journalled in appropriate mountings within the housing 1. Such mountings are well within the capability of one skilled in the art and, accordingly, are not described in detail herein.

The final gear 27 of the speed-reducing train is secured on one end of an elongate shaft 29 journalled within and extending endwise of the housing. The shaft 29 carries a plurality of peripherally notched rotors or cam disks in side-by-side series, five such disks being shown by way of example, these disks being designated D1, D2, D3, D4 and D5. The shaft 29 constitutes a rotatable drive means for the disks, being driven in synchronism with the travel of the vehicle. Each notch, designated 31, is of rectangular formation, and constitutes a detent formation as will appear. The disks have different numbers of notches corresponding to different mileage intervals. Thus, as shown, disk D1 (see FIGS. 3, 4 and 5) has four notches spaced at 90° intervals around its periphery, and may be referred to as the 3000 mile disk. Disk D2 (see FIG. 11) has eight notches spaced at 45° intervals around its periphery, and may be referred to as the 1500 mile disk. Disk D3 (see FIG. 12) has six notches spaced at 60° intervals around its periphery and may be referred to as the 2000 mile disk. The other disks may have one, two or three notches, thereby being 12,000 6,000 or 4,000 mile disks.

Figure 3:
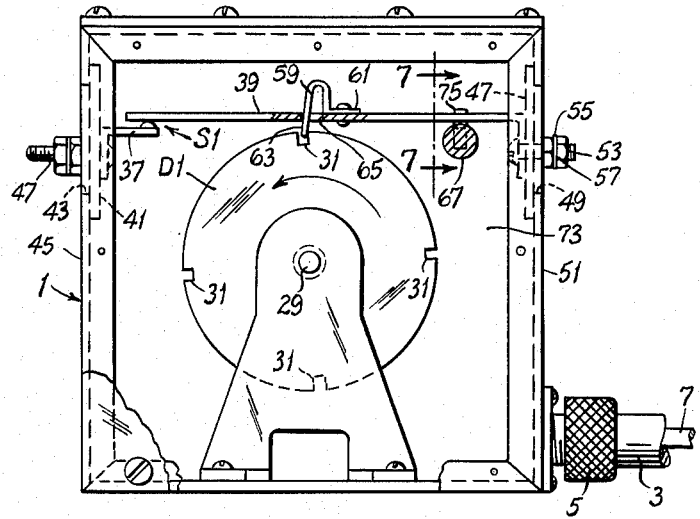
FIG. 3 is a view taken on line 3—3 of FIG. 1, with parts broken away, showing the device in condition for signalling.
Figure 4:
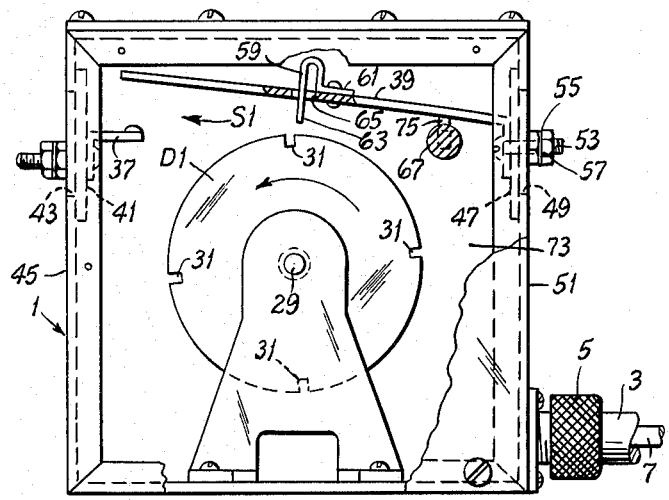
FIG. 4 is a view similar to FIG. 3 illustrating the reset operation.

All five of the disks D1–D5 are adapted to be rotated by the shaft 29 in counterclockwise direction as viewed in FIGS. 3–5, with provision for arrest of any disk while permitting continued rotation of the shaft and the other disks. Rotation of the shaft and disks is at the rate of one revolution for each 12,000 miles of travel of the vehicle. To provide for arrest of any disk while permitting continued roation of the shaft and the other disks, a slippable interconnection constituted by a friction clutch drive 32 is provided between the shaft and each disk. The friction clutch arrangement for each disk comprises, for example, a pair of fluted washers 33 mounted on shaft 29 on opposite sides of the disk (the disk being loose on the shaft), these washers being held in frictional engagement with the disk by pins 35 pressed in transverse holes in the shaft.

Within the housing 1, and positioned adjacent each of the disks D1–D5 are a corresponding plurality of switches S1, S2, S3, S4 and S5 in side-by-side series. Each switch comprises a fixed contact 37 and a movable contact arm 39. The fixed contacts 37 are mounted on an insulating plate 41 backing an elongate slot 43 inside wall 45 of the housing 1. Each fixed contact 37 is provided with a corresponding terminal 47 to which a conductor for an indicating device may be connected. The movable contact arms 39 are resiliently cantilevered from a similar insulating plate 47 backing an elongate slot 49 in the opposite side wall 51 of the housing 1 opposite the slot 43. The contact arms 39 are provided with corresponding terminals 53 and these terminals are commonly connected as indicated at 55 in a power input terminal 57.

Each movable switch arm 39 has a follower 59 adapted to bear on the periphery of the respective disk to hold the arm in open position until the follower drops into a notch in the disk, whereupon the arm engages the respective fixed contact 37 to effect switch closure. Follower 59 is constituted by a hair pin shaped spring member, having one leg 61 secured to the arm 39 and its other leg 63 (which is longer than leg 61) extending through an aperture 65 in the arm with the end of leg 63 engageable with the periphery of the disk. Legs 61 and 63 are adapted to be sprung apart, the outward movement of leg 63 away from leg 61 being limited by engagement of leg 63 with the outer boundary of aperture 65 (see FIG. 3).

A cam bar 67 is mounted for endwise sliding movement in housing 1 below switch arms 39 adjacent their fixed ends and is movable endwise for lifting and lowering these arms. One end of the cam bar is attached to the plunger 69 of a solenoid 71 mounted on end wall 73 of the housing 1. The cam bar is formed with five longitudinally spaced lobes 75 each having an inclined side edge 77 adapted to lift the switch arms 39 when the solenoid 71 is energized. A spring 79 biases the plunger 69 inwardly so that the cam bar normally occupies a retracted position wherein the lobes lie alongside the arms 39 and the latter are thereby released for engagement of the ends of legs 63 with the disks.

Figure 13:
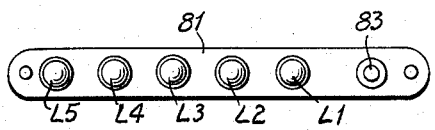
FIG. 13 is a front view of the indicating light panel shown in FIG. 1.

The indicator assembly, shown in FIGS. 1 and 13, comprises an electrically conductive (metal) panel 81 on which are mounted five signal lamps L1, L2, L3, L4 and L5, and a push button switch 83 for operating the solenoid 71. Panel 81 is adapted to be mounted on the dashboard 85 of the vehicle, and thereby grounded. Lamps L1–L5 are controlled by the respective switches S1–S5, and may have printed thereon indicia indicating the related service function. Or such indicia could be printed on panel 81 (made wider for this purpose). For example, lamp L1 could have the word FILTER imprinted thereon, so as to indicate, when energized, that it is time to change the oil filter.

The lamps and the push button switch are connected so that one electrical side of each is connected to the conductive panel 81. Each lamp is connected to a corresponding terminal 47 as indicated at 87 and the push button switch 83 is connected to one terminal 84 of the solenoid 71 as indicated at 89. The other terminal 91 of the solenoid is connected to the power input terminal 57. The latter is connected as indicated at 93 to the accessory terminal of the ignition switch of the vehicle so that power is available to the signalling device only when the ignition is turned on.

The operation of the signalling device is as follows, taking the end disk D1 shown in FIGS. 3, 4 and 5 as an example:

Disk D1 has four notches 31 spaced at 90° intervals around its periphery, corresponding to intervals of 3,000 miles with the gearing ratios predicated previously. The components of the apparatus are initially assumed to be in the positions shown in FIG. 5. In this position, no electric power is available to the corresponding lamp L1 because the switch S1 associated with disk D1 is open, the movable contact arm 39 being held away from the fixed contact 37 by the engagement of leg 63 of the hairpin spring follower 59 with the periphery of the disk D1. As the vehicle is driven, the shaft 29 and the disk D1 are slowly advanced counterclockwise as viewed in FIG. 5. After an interval of approximately 3,000 miles, one of the notches 31 in the periphery of disk D1 will advance to a predetermined angular position in register with the end of leg 63 of the follower 59. The resilient cantilevering of the movable switch contact arm 39 is such that it is normally biased downwardly as seen in FIGS. 3–5. Thus, when the notch 31 is encountered, the leg 63 will drop into the notch as seen in FIG. 3 and the switch S1 will be closed. The closing of the switch S1 will energize the corresponding indicator lamp L1 so as to indicate to the operator of the car that it is then necessary to perform the maintenance function which should be executed at 3,000 mile intervals.

Continued travel of the vehicle will not cause the lamp to be extinguished because the shape of the notch 31 is such that its engagement with the spring leg 63 of follower 59 causes the motion of the disk D1 to be arrested. In other words, the notch 31 acts as a detent formation to receive the spring leg 63 which then functions as a stop member of pawl to block further progress of the disk. It should be noted at this point, however, that this stopping of the disk D1 does not cause the shaft 29 or the remaining disks D2–D5 to be also stopped because relative motion between the disk D1 and the shaft 29 may be obtained merely by overriding the corresponding friction clutch 32. Accordingly, if it is impossible or inconvenient to obtain servicing shortly after the one indication is given, the other interval-determining disks will continue to cumulate mileage so that this interim mileage is not omitted in determining the proper time for performing these other maintenance functions.

While the continued rotation of the shaft 29 will not cause the switch S1 to be reopened by the disk D1, it will cause the pawl or spring leg 63 to be deflected in the direction of disk rotation to the extent permitted by the aperture 65, as shown in FIG. 3.

Figure 7:
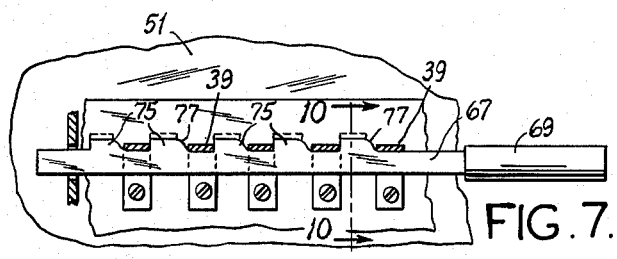
FIG. 7 is a section taken on the line 7—7 of FIG. 3.
Figure 10:
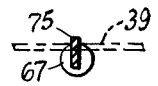
FIG. 10 is a section taken on the line 10—10 of FIG. 7.

When the required service is subsequently obtained, the signalling device may then be reset merely by operating the push button switch 83 so as to energize the solenoid 71. When the solenoid is energized, the plunger 69 and cam bar 67 are drawn to the right as seen in FIG. 7 thereby causing the cam lobes 75 to lift the movable contact arms 39 as shown in FIG. 4. Since the leg 63 of any of the then-operative arms 39 will be deflected to one side of the aperture 65 as described above, the lifting of the movable arm 39 will permit the leg 63 to spring back toward the other leg 61 of the follower to displace the leg 63 from the previously engaged notch 31. Then, when the movable arm 39 is again lowered, the leg 63 will again bear against the periphery of the disk as shown in FIG. 5. Accordingly, it is not necessary to energize the solenoid more than momentarily.

Operation of switches S2–S5 by disks D2–D5 corresponds essentially to that above described for operation of switch S1 by disk D1, and will be apparent. Switch S2 is closed by disk D2 to energize lamp L2 at 1500 mile intervals; switch S3 is closed by disk D3 to energize lamp L3 at 2000 mile intervals, etc. It will be observed that, by reason of the friction drives for the disks, they cumulate mileage intervals independently. Thus, as to any given disk, it starts to cumulate mileage only when the respective arrest pawl 63 is withdrawn from a notch in that disk.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An automotive maintenance signalling device comprising a rotatable drive means adapted to be driven in synchronism with the travel of an automotive vehicle with which said device is employed, a series of rotors, friction means interposed between said drive means and rotors for driving the latter from said drive means, said friction means being slippable so that rotation of any rotor may be arrested while rotation of the other rotors continues, a series of stop members, one for each rotor, each movably mounted adjacent a respective rotor and engageable therewith, each rotor having at least one detent formation interengageable by the respective stop member to arrest the rotation of the rotor when the rotor rotates to a predetermined angular position, a series of signal circuits, one for each rotor, each controlled by the respective rotor and being closed thereby when the rotor rotates to and is arrested in said predetermined angular position, and means for disengaging the stop members from the rotors for resumption of rotation of any arrested rotor.

2. An automotive maintenance signaling device comprising: a rotatable shaft; means for rotating said shaft in synchronism with the travel of the automotive vehicle with which the signalling device is employed; a plurality of cams mounted on and rotatable with respect to said shaft, friction means interposed between said shaft and said cams for frictionally driving said cams with said shaft, each of said cams having at least one detent formation and certain of said cams having a plurality of said detent formations spaced therearound at equal intervals corresponding to desired service intervals; a switch mounted adjacent each cam, each switch having an operating arm carrying a pawl engaging a respective cam and interengageable with a detent formation of said cam for actuating the switch and simultaneously arresting the rotation of the cam; and means for releasing said pawls.

3. An automotive maintenance signaling device according to claim 2 in which said pawls are resiliently displaceable in the direction of cam rotation by engagement with said detent formations whereby release of a pawl from a detent formation permits that pawl to resiliently return to a position spaced from and out of engagement with the detent formation.

4. An automotive maintenance signalling device according to claim 2 in which said cams are disks and said detent formations are notches in the periphery of said disks.

5. An automotive maintenance signalling device according to claim 4 in which each switch comprises a fixed contact, each operating arm is a movable contact arm lying adjacent the periphery of the corresponding cam disk, and each pawl comprises a spring follower projecting transversely from the movable arm and engaging the periphery of the respective disk.

6. An automotive maintenance signalling device according to claim 5 in which said arms have an aperture therein and said followers are hair-pin shaped having one leg thereof secured to said arm and the other leg thereof projecting through said aperture and into engagement with the periphery of the corresponding disk, whereby displacement of the projecting leg in the direction of rotation of said disk is limited by said aperture.

7. An automotive maintenance signalling device according to claim 5 in which the means for releasing the pawls comprises a cam bar including a plurality of cam surfaces, one adjacent each arm, and a solenoid for axially displacing said cam bar whereby said arms are cammed out of engagement with the corresponding disks.

8. An automotive maintenance signalling device comprising: a rotatable shaft means including a plurality of reduction gears for driving said shaft from the speedometer cable of an automotive vehicle with which said signalling device is employed; a plurality of disks mounted on and rotatable with respect to said shaft, the periphery of each of said disks being notched at uniform intervals in correspondence with variously desired service intervals; a friction clutch interposed between the shaft and each disk for frictionally driving each disk in unison with said shaft; a switch mounted adjacent each disk, each switch including a fixed contact, a movable arm lying adjacent the periphery of the disk, and a spring pawl on the arm engageable with the periphery of the disk, said pawls being operative when engaged with one of said notches to hold said disks in switch operating position against the rotation of said shaft; a plurality of indicators connected to corresponding ones of said switches; and means for opening said switches and releasing said spring pawls from said notches thereby to reset said signalling device.

9. An automotive maintenance signalling device according to claim 8 in which said movable contact arms include an aperture adjacent said disk and said spring pawls are hair-pin shaped with one leg attached to the arm and the other leg extending through said aperture, whereby engagement of said other leg with a notch in the periphery of the disk causes said other leg to be displaced in the direction of rotation of said disk to the extent of said aperture and whereby release of said pawls to reset the signalling device permits said other leg to return to normal position.

10. An automotive maintenance signalling device according to claim 8 in which each spring pawl is resiliently displaceable in the direction of rotation of said disk whereby when said pawl is released from a notch in the periphery of a disk it resiliently returns to a position displaced from the notch.

11. An automotive maintenance signalling device comprising a rotatable drive means adapted to be driven continuously in synchronism with the travel of an automotive vehicle with which said signalling device is employed while said vehicle is travelling, at least two cams, friction means interposed between said drive means and said cams for effecting rotation of said cams by said drive means, the latter operating to drive said cams through one revolution for a predetermined number of miles of travel of said vehicle, said friction means being slippable so that one cam may be arrested while the other continues to rotate, two switches, one for each cam, each mounted adjacent a respective cam, each switch having an operating member engageable with the respective cam and being adapted for interconnection with an electric indicating device, each cam having at least one detent formation with which the respective switch-operating member is interengageable as the cam rotates to a predetermined angular position for closing the respective switch and for simultaneously arresting the cam to maintain the switch closed, and means for moving the switch-operating members clear of the cams to disengage either switch-operating member which has been closed from the detent formation of the respective cam for resumption of rotation of the latter cam.

No references cited.

BERNARD A. GILHEANY, *Primary Examiner*.